Patented Nov. 22, 1932

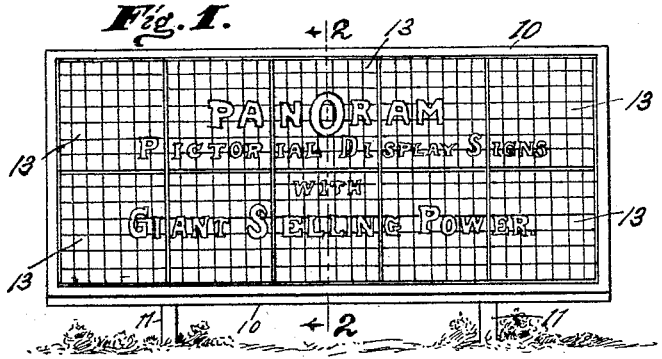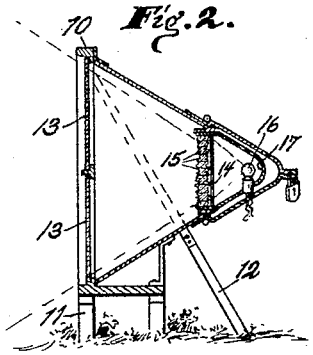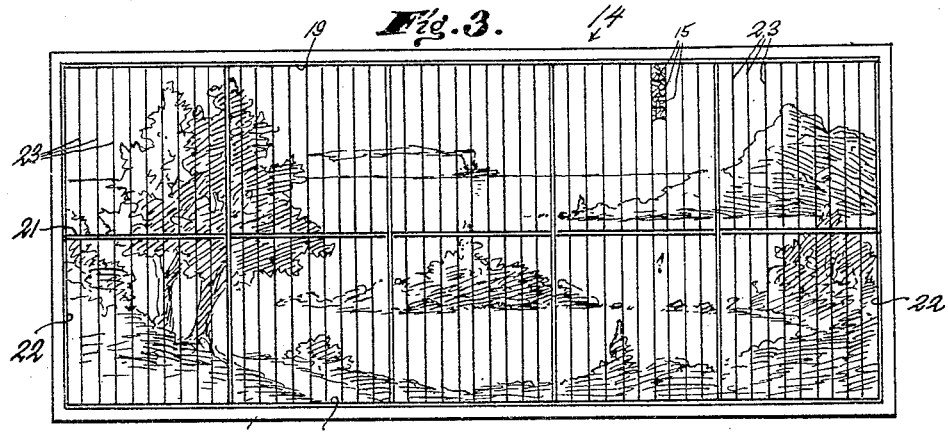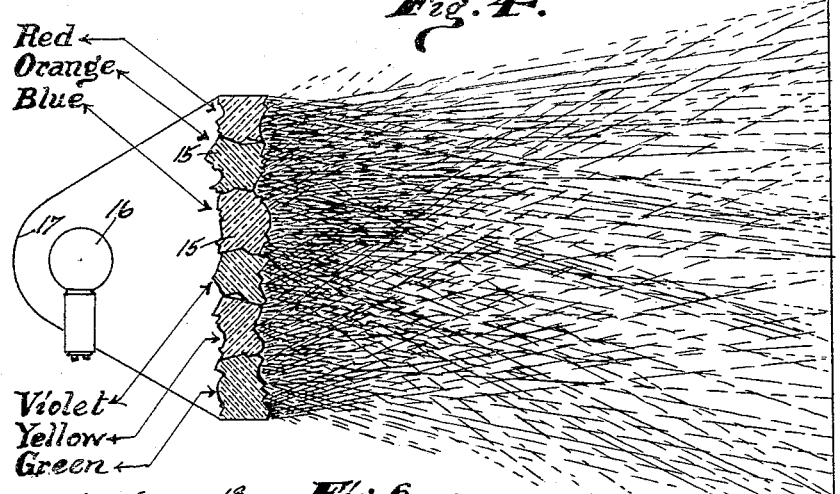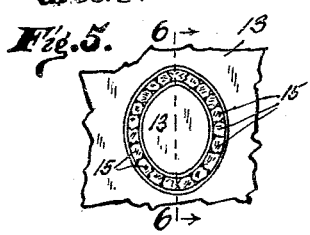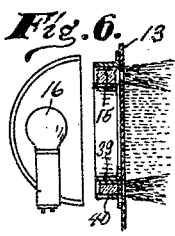

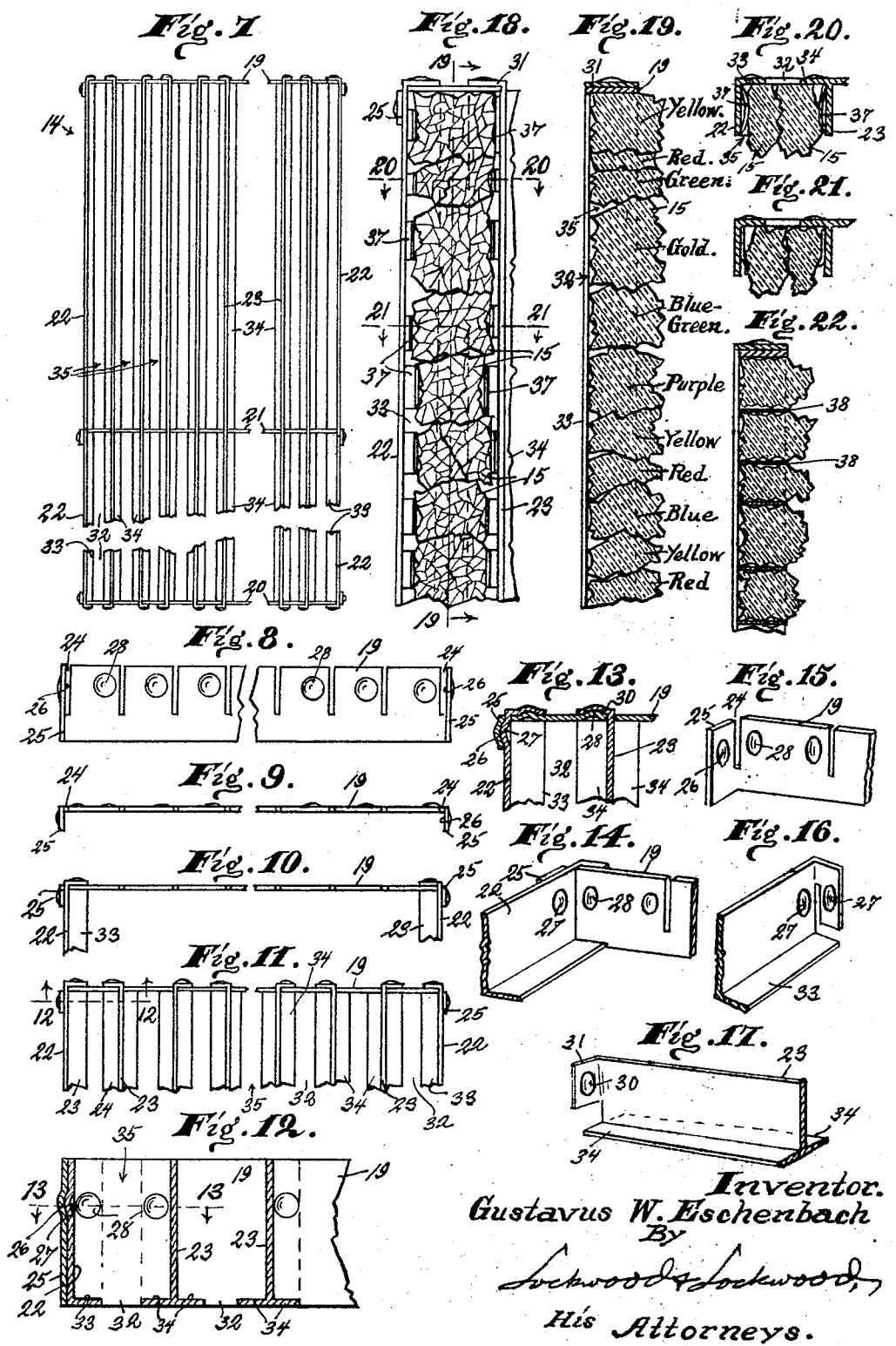
Nov. 22, 1932. G. W. ESCHENBACH 1,888,377
MULTIFORM PRISM ADVERTISING APPARATUS
Filed May 11, 1931 2 Sheets-Sheet 2
Inventor.
Gustavus W. Eschenbach
By
Lockwood & Lockwood,
His Attorneys.

1,888,377

UNITED STATES PATENT OFFICE

GUSTAVUS W. ESCHENBACH, OF LOS ANGELES, CALIFORNIA

MULTIFORM PRISM ADVERTISING APPARATUS

Application filed May 11, 1931. Serial No. 536,437.

This invention relates to means for illuminating and beautifying pictorial display advertising, and is an improvement on my application for a patent on interchangeable block bill-board, filed August 22, 1929, Serial Number 387,569, and the principal object is to provide a multiform prism advertising apparatus preferably in the form of a bill-board with means associated therewith for illuminating the advertising thereon in natural colors additionally beautified by directing the light through a multiplicity of varicolored prisms, thereby causing a flood of light of dazzling brilliancy to illuminate the advertising, thereby more readily attracting the attention of the public to the bill-board.

To that end I provide a bill-board having a main skeleton frame in which transparent or semi-transparent front panels are detachably and interchangeably arranged on which pictorial advertising can be placed with means either in front or rearward of the panels for throwing a flood of light on the panels that is first directed through a cluster of varicolored prisms interposed between the lamp and the bill-board for causing the light to be colored and diffused. Another object of the invention is to provide a simple means for illuminating pictorial advertising that includes a skeleton frame adapted to be filled with prisms corresponding in color to the natural colors of the scene to be illuminated. To that end I provide a prism frame formed of sheet metal bars of various lengths that can be detachably connected to form a skeleton frame having open channels therein in which the varicolored prisms can be arranged and secured so that when the frame is interposed between the bill-board and lamp a flood of various colored lights will be thrown on the pictorial advertising.

The frame is formed of suitable size so it can be placed over a picture that is a miniature of the pictorial advertising on the board and when so placed various features of the picture are visible through the open channels so that the prisms corresponding to the colors of the picture can be arranged and secured in the channels so that when the light is passed through the prisms a flood of light in natural colors and of great brilliancy will be thrown on the pictorial advertising.

A feature of the invention is shown in arranging colored multiform prisms formed of broken pieces of colored glass or semi-precious stones or clear quartz and the like to form multi-colors for illuminating pictorial advertising especially that adapted to billboards.

The accompanying drawings illustrate the invention, in which:

Fig. 1 is a semi-diagrammatic front view of a bill-board constructed in accordance with this invention. Fig. 2 is a central vertical section on the line 2—2 of Fig. 1, showing the multi-form prisms arranged in position to throw a flood of colored light on the transparent panels of a bill-board from the rear thereof. Fig. 3 is a semi-diagrammatic plan view of the prism frame arranged over a miniature picture of a pictorial advertisement to be arranged on the bill-board showing diagrammatically the channels that are to be filled with the prism in a natural color of the picture. Fig. 4 is a semi-diagrammatic view of a lamp and cluster of prisms illustrating how the colored rays of one prism are thrown through the colored rays of the others with accompanying legends indicating the colors of the prisms. Fig. 5 is a fragmental front view of the top center panel of Fig. 1, showing a modified means of forming the letter O of the word "Panoram," the latter having a band of prisms around it. Fig. 6 is a central vertical section on the line 6—6 of Fig. 5, showing the arrangement of the prisms and lamp for illuminating the letter O. Fig. 7 is a fragmental plan view of the knockdown prism frame showing the parts about actual size. Fig. 8 is a fragmental inside view of an end plate of the prism frame. Fig. 9 is a plan view of the part shown in Fig. 8. Fig. 10 is a view analogous to Fig. 9 with side plates detachably connected to the end plate. Fig. 11 is a view analogous to Fig. 10 with the intermediate T-plates detachably secured to the end plate.

Fig. 12 is a greatly enlarged section on the line 12—12 of Fig. 11 showing a detail of the detents for detachably securing the parts together. Fig. 13 is a fragmental section on the line 13—13 of Fig. 12 further illustrating the interlocking engagement of the detents of the prism frame. Fig. 14 is a perspective view of a corner portion of an end plate and side plate detachably secured together. Fig. 15 is a perspective view of the end plate detached from the side plate. Fig. 16 is a perspective view of the side plate detached from the end plate. Fig. 17 is a fragmental perspective view of one of the intermediate plates used for forming channels in which the prisms are secured. Fig. 18 is a fragmental plan view of the upper left hand corner portion of Fig. 7, showing a number of prisms secured in the left hand panel of the frame. Fig. 19 is a central vertical section on the line 19—19 of Fig. 18. Fig. 20 is a fragmental cross section on line 20—20 of Fig. 18. Fig. 21 is another cross section on line 21—21 of Fig. 18. Fig. 22 is a section analogous to Fig. 19 with opaque spacer plates arranged between the prisms so that the rays of light from the prisms will not intermingle until after they have passed beyond the prism frame.

I provide a main skeleton frame 10 in the form of a bill-board supported upon posts 11 and back-braces 12, and preferably the front part of the bill-board is made up of a plurality of rectangular plates secured together as illustrated in the application hereinbefore referred to, or if desired the front can be made up of transparent panels 13 that are removable from the frame and interchangeable, as also illustrated in the prior application referred to. Preferably the panels 13 are transparent and have the pictorial advertising placed on their front faces in natural colors when displaying pictures and the like, and back of these panels is a demountable prism frame 14 in which a plurality of colored multiform prisms 15 are secured in position to throw a flood of colored lights on the rear of the panels 13 to illuminate the advertising. A lamp 16, having a reflector 17, is arranged rearwardly of the prism frame 14.

As shown in Figs. 7 to 22, inclusive, the prism frame is constructed as follows:—I provide end plates 19 and 20 with a cross plate 21 to which the side plates 22 and intermediate plates 23 are detachably secured as shown. The end plates have overlapping corner slots 24 and corner extensions 25 that are arranged at right angles to the plates 19 and 20 and these extensions have recesses 26 into which the detents 27 of the side plates 22 are extended and detachably secured.

These end plates have detents 28 extending into recesses in the ends of the intermediate plates in a manner similar to the connection of the corner portions of the side plates. In other words, the end plates have detents 28 that are fitted into the recesses 30 of end flanges 31 that are integral with the intermediate plates 23. The intermediate plates 23 are spaced apart from one another and also from the side plates so as to form elongated slots 32 between their flanges 33—34 on which the prisms 15 are seated when arranged in the elongated channels 35 between the plates.

The prism frame when assembled is made of suitable size to cover a pictorial advertising that is a miniature reproduction of the advertising to be placed on the face of the bill-board, as illustrated in Fig. 3. In this figure it is assumed that the prism frame is laid down over a small picture having land and trees in the foreground, an island in the bay, and mountains and a steam vessel in the distance, this picture being assumed to be placed on the face of Fig. 1 when put in use; and when the prism frame is placed over this miniature picture the multiform prisms 15 can be placed and secured in the channels 35 to reproduce in colors the picture shown in Fig. 3, so that when the prism frame is filled with the prisms and placed before the lamp 16 in Fig. 2, the colors of this picture will be projected to and through the transparent panels to illuminate the advertising in colors.

It is understood that this frame can be placed in front of the bill-board and the flood of colors thrown on the advertising from that position. Preferably the multiform prisms 15 are formed of broken pieces of transparent glass of various colors, but can be formed of broken pieces of transparent quartz and semi-precious stones.

The glass and stones are broken to give them a ragged exterior at the sides and ends so that when light is directed through them it will spread out in a flood of prismatic colors of great brilliancy as illustrated diagrammatically in Fig. 4. As seen therein there are six multiform prisms grouped together, having the colors of red, orange, blue, violet, yellow and green, each stone having a ragged prismatic exterior that causes the rays of light from the lamp 16 to blend in a flood of dazzling color.

Preferably these multiform prisms are secured in the prism frame as illustrated in Fig. 18, that is, the prisms are arranged centrally over the slots 32 and are secured in that position by spring plates 37 so that when the frame is supported in front of the lamp 16 the prisms will be secured on the slots 32 so the light will be directed centrally through the prisms to illuminate the bill-board, stage or the like.

It is understood that any suitable means may be employed in securing the prisms in the frame. If desired, the prisms can be separated from one another by opaque plates 38, as illustrated in Fig. 22, and when such plates are used, the lights through the prisms do not blend until after they have passed beyond the outer surface of the frame. If desired the multiform colored prisms can be arranged directly in the bill-board panels 13, as illustrated in Figs. 6 and 7.

In Fig. 6 it is assumed that the letter O in the word "Panoram" shown in Fig. 1, is formed of multiform prisms that are set in the face of the panel 13. In other words, I secure angle irons 39—40 to the back of a panel 13 around an opening through the panel in the form of a large letter O, and in the space between these irons I fill with the prisms 15 and arrange a lamp 16 near them so that it will direct light through the prism 15 to illuminate the letter. It is understood that all of the letters can be so formed if desired. It is also understood that this form of arranging the multiform prisms can be adapted to emphasize or beautify anything placed on a bill-board, such, for instance, as imitating diamonds worn as a necklace, or a ring on the finger of a beautiful lady, if pictured on the bill-board, or can be used for other artistic purposes.

In operation the apparatus is used as described.

I claim as my invention:

1. In a multiform prism advertising apparatus the combination with a main skeleton bill-board frame, panels therein having pictorial advertising thereon, of a lamp for illuminating the advertising on said panel, a demountable prism frame in said main frame and multiform prisms of different colors grouped together and interposed between said lamp and panel for the purpose specified.

2. In a multiform prism advertising apparatus the combination with a main skeleton frame, transparent panels therein, having pictorial advertising thereon, of a lamp for illuminating the advertising on said panel, a demountable prism frame formed of sheet metal plates interposed between said lamp and panel, and multiform varicolored prisms arranged in said prism frame to throw a flood of brilliant light on said panel for the purpose specified.

3. In a multiform prism advertising apparatus, the combination with a main skeleton bill-board frame, transparent panels having panoramic pictorial advertising thereon, of a lamp for illuminating the advertising on said panel, a knock-down prism frame having channels therein, and varicolored multiform prisms placed in the channels of said prism frame to illuminate the pictorial advertising in the natural colors of the picture subject-matter.

4. In a multiform prism advertising apparatus the combination with a bill-board, transparent panels therein having pictorial advertising placed thereon, of a lamp for illuminating the advertising on said panels, a knock-down skeleton prism frame interposed between said lamp and panels, and a cluster of varicolored multiform prisms detachably secured in said prism frame in position to throw a flood of brilliant colored lights on said pictorial advertising.

5. A multiform prism advertising apparatus including a prism frame having end and side plates with their ends secured together to form detachable interlocking corners, cross plates and intermediate plates detachably secured to the end and side plates, and multiform varicolored prisms secured in said frame for the purpose specified.

6. A multiform prism advertising apparatus including a skeleton prism frame having end and side plates with their ends secured together to form detachable interlocking corners, cross plates and intermediate plates spaced apart to form elongated channels, said intermediate plates detachably secured to the end and side plates, and multiform transparent prisms differing in colors secured in said frame for the purpose specified.

7. A multiform prism advertising apparatus including a skeleton prism frame having end and side plates with their ends detachably secured together by overlapping extensions and detents to form interlocking corners, cross plates and intermediate plates detachably secured to the end and side plates arranged to form elongated channels through which light can pass transversely, multiform transparent prisms differing in color and formed of broken glass or semi-precious stones arranged in rows central to said channels, and means for securing said prisms as arranged in said channels.

8. The combination set forth in claim 7, with flanges integral with said side and intermediate plates on which said prisms are seated and secured.

In witness whereof, I have hereunto affixed my signature.

GUSTAVUS W. ESCHENBACH.